United States Patent Office 3,255,573
Patented June 14, 1966

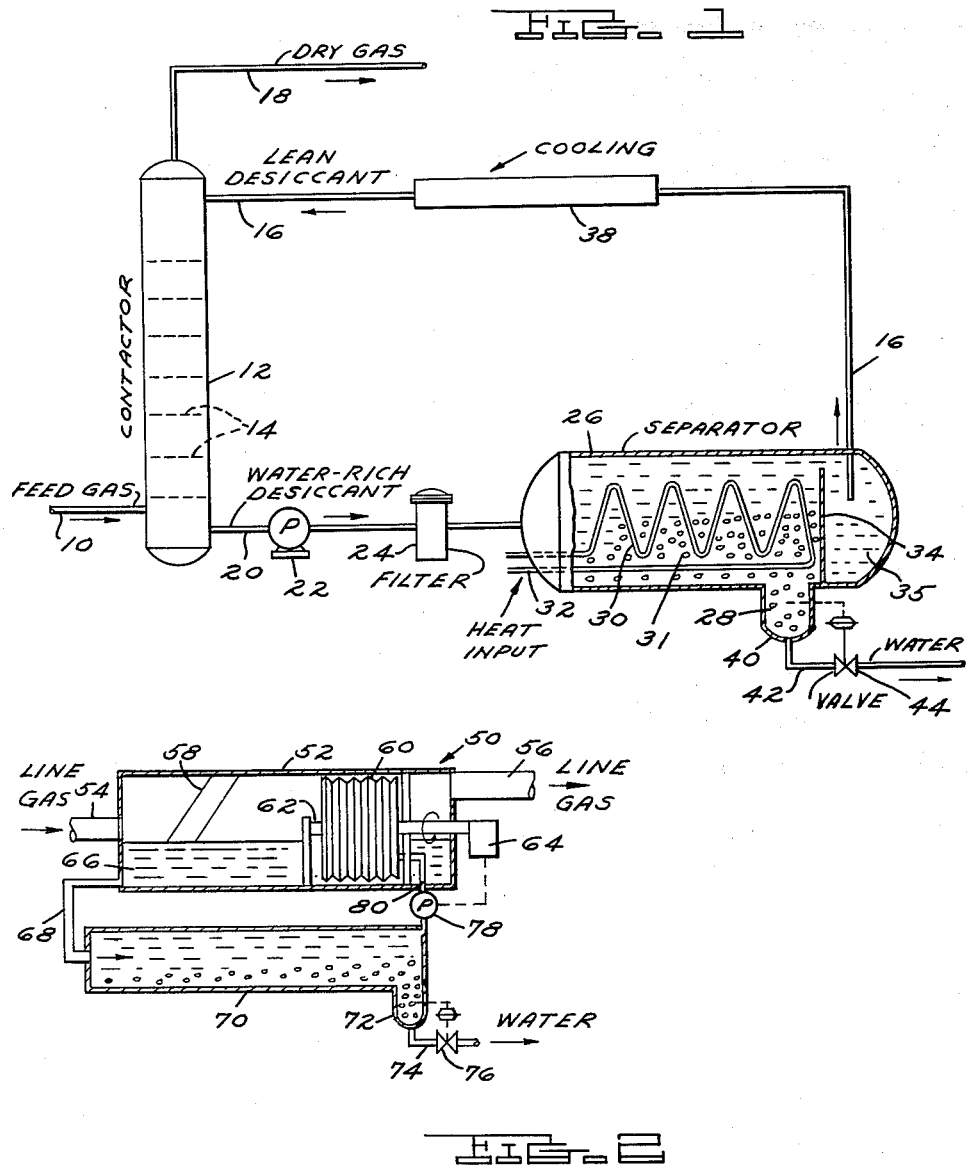

3,255,573
DEHYDRATION OF GASES
Landrum C. Cox, Jr., Birmingham, Mich., assignor of one-half to August C. Karbum, Redford, Mich.
Filed Apr. 16, 1963, Ser. No. 273,363
3 Claims. (Cl. 55—32)

This invention relates to the dehydration of gases, and more particularly to an improved method of gas dehydration. The method of the invention can be practiced as a separate and discrete operation or as an adjunct to the cleaning of gas in a natural gas scrubber of the oil-bath type, and/or to the transmission of gas in a natural gas transmission system equipped with such scrubbers, so as to clean and dry the gas as it is transmitted therethrough.

In the natural gas industry it is common practice to dehydrate gases by intimately contacting gas streams with liquid or solid desiccants or drying agents. Other methods such as the low temperature processes utilize temperature reduction by expansion or mechanical refrigeration to induce condensation separation.

In processes utilizing a liquid desiccant, the desiccant is usually one of the glycols. Some disadvantages of this type of process are high initial cost of equipment and desiccant, losses of desiccant through vaporization and entrainment carryover, high energy requirements to accomplish stripping and high maintenance costs for the various heat exchangers, boilers, etc. Since efficient absorption will not occur at temperatures above about 100° F., and since reboiler temperatures are usually on the order of 375° F., some idea of the heat energy requirements may be had. Additionally, since the reboiler is operated at or near atmospheric pressure, substantial energy is required in the form of pump power necessary to recirculate the desiccant into the higher pressures of the absorber.

In adsorption processes utilizing solid or dry desiccants, the gas is contacted with beds of the solid desiccant which adsorbs the water. These processes require two or more adsorber vessels half of which must be regenerated while the remainder dehydrate the gas stream. As the dehydrating vessel becomes saturated, the gas stream is diverted to the regenerated adsorber and the saturated adsorber is then regenerated. These processes also have several disadvantages. These include relatively high initial investment (due to the necessity for multiple adsorbers and their related valves and piping), periodic replacement of expensive desiccant, risk of desiccant poisoning by contaminants in the gas stream, expensive shut-downs for inspection of the regeneration gas heaters, cyclic variation of the water content of the effluent gas and the high heat load requirements.

The low temperature processes usually require very high inlet gas pressures which must be reduced for pipe line handling. Because such processes involve expansion and require a substantial pressure drop, they are not economically feasible where a large volume of gas must be handled and pressure must be obtained by means of compression.

An object of the present invention is to provide an improved method of gas dehydration in which the above-mentioned disadvantages are eliminated.

Another object is to provide an improved method for dehydrating gas in which existing liquid desiccant dehydration process equipment may be utilized while at the same time eliminating the disadvantages thereof as well as the need for much of the expensive equipment hitherto required.

Still another object is to provide a method of operating gas processing equipment of the type wherein gas is contacted with oil, such as an oil bath type gas dust scrubber, to effect dehydration as well as cleaning of the gas processed therein.

Yet another object is to provide an improved method of operating a gas transmission system to effect progressive dehydration of the gas in an economical manner as it is transmitted through the system.

Other objects, features and advantages of the invention in its various aspects will become apparent from the following detailed description, appended claims and accompanying drawing wherein:

FIG. 1 is a flow diagram of an assembly of apparatus parts suitable for practicing one embodiment of the gas dehydration method of the present invention.

FIG. 2 is a flow diagram of an oil bath type gas dust scrubber converted and operated in accordance with the present invention.

To summarize the invention, the above-mentioned objects are achieved by intimately contacting a stream of gas containing water in a liquid and/or vapor state with a liquid desiccant composition of the invention comprising a hydrocarbon liquid vehicle containing a relatively small percentage of an organic compound which is soluble in the vehicle and which forms a water and vehicle emulsion or aids in coupling water to the vehicle. One preferred example of this composition comprises a high boiling hydrocarbon of the fuel oil or motor oil range, such as mineral seal oil, which serves as the vehicle, to which is added approximately one percent by volume of an oil soluble desiccant, such as a nonyl phenoxy polyoxyethylene ethanol condensate. It has been found that water, whether in a liquid or vapor state in the stream of gas, is removed from the gas stream upon contact with this composition and is retained in the contacting medium in the form of an emulsion.

The invention further contemplates the removal of the water so retained in the contacting medium in order to regenerate the composition for re-use in the above method. It has been found that this water can be readily separated by several demulsifying methods, particularly those which feature one or more of the following water separation steps: (1) raising the temperature of the water-rich contacting medium to effect a rapid and high order separation; (2) adding a small amount of a suitable chemical, such as glycol ether, which will destroy the interfacial film between the colloid droplet and the dispersion medium to effect a rapid and high order separation; and (3) placing the water-rich contacting medium in a passive condition without agitation to effect natural separation.

The improved gas dehydrating method and composition of the invention may be applied to a natural gas dehydration process employing process apparatus as illustrated in FIG. 1, the apparatus parts of which are explained hereinafter in conjunction with the operation of the process. Water-containing feed gas from a source, such as a well-head (not shown), is fed to the system through a pipe 10 to a suitable gas-liquid contactor 12, such as a conventional counterstream tower, bubble cap tower or a dust removal scrubber, of either the vertical or horizontal type. The gas to be dried enters near the bottom of contactor 12 and flows upwardly therein through a series of bubble trays 14 wherein it is intimately contacted by a liquid desiccant solution of the aforementioned type, preferably mineral seal oil containing a small percentage of a nonyl phenoxy polyoxyethylene ethanol condensate dissolved therein. This liquid desiccant is introduced in a water-free or water-lean state via a pipe 16 to the top of contactor 12 and flows downwardly therein, counter to the gas stream, from one bubble tray to the next lower tray until it reaches the bottom of the contactor tower. It is to be noted at his point that the viscosity of the lean desiccant solution may be varied to the extent necessary for optimum contact. Hence the absorption process of the invention permits greater latitude in contactor design and operating conditions than in glycol processes wherein the viscosity of the glycol solution is a limiting factor.

Vapor effluent of reduced water content, specifically the dried natural gas, is withdrawn from the top of contactor 12 through outlet conduit 18, and spent water-rich liquid desiccant is withdrawn from the bottom of contactor 12 through conduit 20. The spent water-rich solution, now an emulsion, is then fed by a pump 22 through a filter 24 to a separator 26 or other suitable means for performing one of the previously described methods of water separation. Separator 26 performs the presently preferred separation step which comprises disturbing the equilibrium of the emulsion by raising its temperature moderately, for example approximately 30° F., which causes the water in the liquid state to agglomerate and collect at the bottom of the separator (as schematically represented by the droplets of water 28 in FIG. 1).

Separator 26 is a closed vessel normally operated so as to be flooded by liquid and adapted to contain liquid under system pressure, on the order of 300–1000 p.s.i.g. A suitable heating coil 30 is disposed in the separating section 31 of the separator and steam or other heating medium is circulated therethrough via lines 32. An imperforate baffle 34 defines one end of separating section 31 and forms a barrier to the low level water agglomerating therein. The water-lean oil and desiccant solution overflows the top of baffle 34 and collects in a weir section 35 of separator 26. The pressure head induced by pump 22 forces the regenerated lean desiccant solution from weir section 35 into the inlet end of return pipe 16 which conducts it through a cooling section 38 wherein the heat supplied to the solution in the separator is removed. The cooled, water-lean desiccant is then re-introduced into the top of contactor 12. Alternatively, the heat may be rejected to the gas stream after introduction into the conactor. The separated water collects in a sump 40 from which it is removed via a line 42 under the control of a conventional float-controlled discharge valve 44. The desiccating agent is preferentially retained in the liquid vehicle although minute quantities may be lost with the rejected water.

In lieu of the heating method described above, the aforementioned chemical water separation method may be employed in the method of the invention. It has been found that separation of the process emulsion will occur very readily when a small quantity of a suitable chemical is added thereto, e.g., a glycol ether when the liquid desiccant is of the ether structure type. This method of separation does not require either heat or a large separation chamber. The rate of separation is susceptible to accurate control and the cost of glycol ether is not prohibitive.

The aforementioned natural separation method contemplated by the invention is performed in the apparatus of FIG. 2 wherein a method of operating a natural gas dust scrubber 50 also in accordance with the invention is illustrated. Gas scrubber 50 is a conventional horizontal, oil-bath type gas scrubber such as that manufactured by the King Tool Company of Longview, Tex., and commercially identified as Model HS King Gas Scrubber. It is customary to provide several of these units in series in and widely spaced along a natural gas transmission line. These scrubbers are designed to remove entrained dirt and other foreign matter from the gas by direct contact with oil-water surfaces.

Scrubber 50 comprises a horizontal pressure vessel 52 through which pipe line gas flows axially from an inlet line 54 to an outlet line 56. Gas entering vessel 52 first flows through a mist extractor 58 wherein the major portion of the water present in the gas stream in a liquid state is knocked out. The gas then flows through a rotary scrubbing drum 60 which consists of a number of corrugated cylinders concentrically arranged around a driven shaft 62 journalled in suitable bearings. Shaft 62 is driven by a gear motor 64 to rotate drum 60 slowly through an oil bath 66 which fills the lower third of the vessel. The natural gas, passing through the unsubmerged upper portion of drum 60 is forced to travel the labyrinth presented by the corrugated cylinders and, in so doing, is cleansed of foreign matter by contact with the oil-wetted surfaces thereof. The contact surfaces are "washed" in the oil bath as they rotate therethrough, thus insuring a clean film of oil on the exposed portion of the scrubbing drum at all times.

In accordance with the present invention, the above gas scrubber 50 and others of a similar type may be converted to operate as a combination natural gas dust scrubber and dehydrator at nominal cost. This is accomplished by the addition of an oil soluble desiccant, such as a nonyl phenoxy polyoxyethylene ethanol condensate, to the scrubber oil. This causes the scrubber oil to form an emulsion with any water in liquid or vapor form in the gas stream which contacts the oil and desiccant solution picked up by the drum or present at the liquid-gas interface of bath 66. Preferably, sufficient desiccant is added to the scrubber oil to provide a concentration on the order of one percent desiccant to 99 percent oil by volume. The resulting emulsion collects in bath 66 and is continuously withdrawn therefrom via an outlet line 68 and fed to a separation or demulsifying tank 70.

The natural water separation method is employed in tank 70, the tank comprising a closed vessel flooded at system pressure wherein the water, in liquid state, is separated from the oil and desiccant solution and sent to disposal via a sump 72 and outlet line 74 controlled by a suitable gravity float-controlled blowdown valve 76. A continuous circulation is induced by a pump 78 located in a return line 80 at a rate such that the emulsion from line 68 is drawn at midpoint into tank 70 and goes into a natural, partial separation, the flow rate insuring an absence of severe agitation. A zone of almost pure water will appear at the bottom of the tank and a zone of almost pure oil and dissolved desiccant solution will appear at the top of the tank, the remaining zone being graded emulsion from top to bottom. The return line 80 taps the top zone, and line 74 withdraws water at the bottom.

Suitable provision may be made for either periodically or continuously making up very small amounts of desiccant and oil solution, depending upon the efficiency of separation. Although it is presently preferred to operate the entire system substantially at line pressures, a low pressure water separation system may be used which would require a de-gasifier and a circulating pump capable of injecting against high pressures.

It is recognized that the contact efficiency of scrubber 50 for dehydration purposes will not approach that of the conventional contactor 12 which is expressly and solely designed for dehydration. However, this is offset by the ability of the gas scrubber 50 to remove water from the gas stream when operated in accordance with the invention at relatively low cost since the vehicle, e.g., scrubber oil is already present and only a relatively inexpensive water separating unit need be added. Moreover, when in accordance with the present invention each of a plurality of dust scrubbers 50 customarily provided in a natural gas transmission line at intervals therealong is modified and operated in accordance with the method of the invention illustrated in FIG. 2, progressive dehydration of the natural gas is obtained in a step-by-step manner as it is transmitted through the pipe line system, dehydration occurring at each point where gas is processed through the scrubbers. In this manner, although the efficiency of each dust scrubber in terms of pounds of water per MM c.f. removed per pass may be relatively low, the cumulative water removal obtained by all of the converted dust scrubbers is of a significantly high order. Either of the other two aforementioned methods of water separation may also be employed. All three methods can be combined in the same equipment if suitably designed and the equipment can be operated to selectively or concurrently perform these methods.

With respect to the composition of the invention, the presently preferred vehicle is an inexpensive mineral seal oil or other hydrocarbon oil, although it is considered to be within the scope of the invention to employ other vehicle materials which are inert to the gas being dehydrated and adapted to form an unstable emulsion with water. The particular oil comprising the vehicle is selected for the temperature and pressure conditions in the contactor, e.g., higher contactor temperatures require a higher boiling point oil, and higher pressures permit use of lowe boiling point oil. The preferred desiccating agent for an oil vehicle is an organic compound of the ether structure type suitably balanced as to vehicle solubility and water absorption, specifically a nonyl phenoxy polyoxyethylene ethanol condensate in the case of mineral seal oil which is dissolved in the oil in sufficient amount to form about a one percent concentration by volume. Of course, the exact composition of a functional mixture depends upon several variables and is readily determinable for the particular application by one skilled in the gas dehydration art, taking into consideration such factors as the particular process equipment employed and the dynamic movements of the gas stream and contacting medium therein, the water content and temperature of the feed gas, the type of gas, the percent absorption desired, availability and local cost of materials, etc.

For example, the design operating temperature and pressure of the particular gas-liquid contact apparatus employed to practice the method of the invention will affect the choice of the particular vehicle employed in the composition of the invention. The upper limit of the boiling point range of the vehicle is determined by the equilibrium vapor pressure in the particular gas-liquid contact apparatus during normal operation. In other words, in a high pressure contactor a more volatile vehicle may be used so long as its boiling point is below the operating temperature of the contactor for the given operating pressure. The lower limit of the boiling point range of the vehicle selected depends upon its viscosity at the given operating temperature of the contactor. The vehicle should be selected so that it is not too viscous for efficient gas-liquid contact at the operating temperature, also bearing in mind the amount of contact area available in the particular apparatus employed. Thus from the standpoint of the physical characteristic of the vehicle of the composition, it is a hydrocarbon material which is liquid or flowable at the particular operating temperature and pressure of the apparatus so as to be capable of efficient circulation through the apparatus, preferably for counterflow contact with the gas stream. Also, the vehicle when in solution with the desiccant is capable of forming a water-in-vehicle emulsion in the contactor.

The preferred disiccant material of the composition of the invention is an ethylene oxide condensate such as those commonly designated as non-ionic surfactants and ordinarily used for such functions as wetting, detergency, emulsification and dispersion. One specific example of a suitable ethylene oxide condensate is a blend of nonylphenoxypoly (ethyleneoxy) ethanol products, such as those sold under the trademarks Igepal CO-530 and Igepal CO-430 by Antara Chemicals division of General Aniline & Film Corporation of New York, N.Y. Such surfactants are in chemical structure a polyoxyethylated nonylphenol made by the chemical reaction of nonylphenol with different amounts of ethylene oxide. The amount of ethylene oxide combined with nonylphenol determines the solubility in water, oil or solvents. By increasing the amount of ethylene oxide in relation to the nonylphenol, a series of products with different hydrophobic-hydrophilic balances is obtained. Increased solubility in water and water-miscible solvents is found in the types which contain larger amounts of ethylene oxide. Those with lower amounts of ethylene oxide are soluble or dispersible in mineral-based oils and water-immiscible solvents. Gradual variations between these two extreme kinds of solubilities may be obtained by mixing two or more of these products as desired until the proper balance is achieved. For example, considering mineral seal oil as the vehicle, a suitable desiccant blend comprises three parts of a nonylphenoxypoly (ethyleneoxy) ethanol product containing about 54 percent by weight of ethylene oxide with one part of a nonylphenoxypoly (ethyleneoxy) ethanol product containing about 44 percent by weight of ethylene oxide. The 54 percent product has a hydrophobic-hydrophilic balance lying at the borderline between oil solubility and water solubility, and addition of the 44 percent product tips the balance of the resulting blend to solubility in the mineral seal oil. Solubility of the desiccant in a paraffin-type oil vehicle can also be promoted by adding aromatic components, such as xylene, to the oil.

The aforementioned balancing adjustments in the desiccant and/or vehicle of the composition are useful in raising the range of separation temperature where such is necessary or desirable to suit operating conditions, as where elevated operating temperatures are encountered, since increasing the solubility of the desiccant in the vehicle also tends to increase the stability of the in-process emulsion. Thus the emulsion product of gas dehydration can be made to remain stable while in a high temperature contactor so that the water is withdrawable in this form, and yet remain susceptible to practical demulsification outside the contactor by the addition of moderate amounts of heat energy or by employing some other demulsifying technique to accelerate breaking of the emulsion. The composition can also be adjusted with respect to the percent concentration of the desiccant in the vehicle, higher concentrations tending to make the emulsions more stable but sacrificing ease of breaking the emulsion in the separation stage.

The maximum temperature of the gas in the gas-liquid contact zone of the apparatus employed in the method of this invention should not exceed about 150 degrees Fahrenheit. The practical minimum operating temperature of the gas is determined by the hydrate formation zone for the particular gas, e.g., for natural gas about zero degrees Fahrenheit as a lower limit. The lower limit of operating pressure in the contact apparatus is about one atmosphere while the upper limit is determined by the ability of the apparatus employed to withstand high pressures. However, as a practical matter when gas is under pressure exceeding 1,000 p.s.i.g., the water content is so low that there is little or no need for a dehydration process.

From the foregoing description, it will now be apparent that the improved method and composition of the invention provide several advantages over the previously mentioned prior art methods and compositions employed in conventional gas dehydration systems.

One important advantage is a reduction in the equipment investment required. If the natural or chemical water separation steps are employed, no heat exchanger is required. If the heat separation step is employed, a very simple separator unit 26 is substituted for the usual reboiler and still. The operating pressures of the dehydrating system of the invention may vary over a wide range, from a closed system operating substantially at gas line pressure (on the order of 300-1000 p.s.i.g.) to a separation system operating substantially at atmospheric pressure. With the closed high pressure system, a less expensive circulating pump 22 is required and the piping and valves are less complex and hence less costly.

The heat energy required to operate separator 26 is much less than that required in conventional liquid desiccant dehydration processes because there is no need to obtain distillation temperatures. With a single pressure closed system, gas losses through flaring are also eliminated. Improved efficiency also results from the extent to which the viscosity of the contacting medium may be varied to suit operating requirements and the particular contacting equipment employed.

Due to the use of an inexpensive vehicle, such as ordinary lubricating oil, fuel oil, mineral seal oil or kerosene, and only a small percentage of dissolved desiccant, the cost of dehydrating materials is substantially reduced. For example, as compared to a conventional glycol system, wherein for instance 100 gallons of glycol may be employed to remove 10 gallons of water, the method of the invention on a comparative basis utilizes 99 gallons of ordinary oil and 1 gallon of an oil soluble desiccant to remove the 10 gallons of water. In terms of the present market cost of these respective materials, this represents a reduction to roughly one-sixth of the glycol system material cost. In addition, when a hydrocarbon oil is used as the principal component of the contacting medium, the oil component of the natural feed gas will tend to come out of the gas and add to the supply of vehicle in the system.

The method of the invention also avoids criticality with respect to temperatures in the dehydration process. For example, as compared to the glycol system where the glycol must be under 100° F., the method of the invention is adjustable to suit the temperature of the incoming feed gas being dehydrated by the aforementioned balancing and adjustment of the liquid desiccant and oil vehicle for absorption at higher temperatures.

Although the invention is primarily concerned with dehydrating natural gas, it is to be understood that any gas chemically insert to the oil-base contacting medium, such as some of the inert gases and compressed air at low pressures, may be dehydrated by the method of the invention.

I claim:

1. A method of dehydrating a gas comprising the steps of contacting the gas in a given temperature range and at a pressure ranging upward from about 300 p.s.i.g. with a water-absorbing solution comprising a liquid vehicle containing a dissolved desiccant adapted to form an emulsion with water having borderline stability in said temperature and pressure ranges such that an emulsion with water is formed which is stable in said pressure and temperature ranges but wherein the solubility of the water in said desiccant in said emulsion decreases with an increase in temperature whereby said emulsion becomes unstable above said temperature range in said pressure range and regenerating the solution while recirculating the same by removing the emulsion from contact with the gas and flowing the said emulsion to a separator and raising the temperature of the removed emulsion a moderate amount above said temperature range in said separator while maintaining the removed emulsion substantially in said pressure range sufficiently to induce separation of the water therefrom while maintaining the separated water in the liquid phase whereby the absorbed water is removed from the emulsion.

2. A method of dehydrating natural gas comprising the steps of flowing the gas through a gas-liquid contact apparatus within a predetermined pressure and temperature range, introducing into the apparatus a water-absorbing solution comprising a hydrocarbon material which is a liquid in said pressure and temperature ranges and a desiccant of the ether structure type dissolved in said hydrocarbon material and balanced to form an emulsion with water which is stable in the apparatus in said pressure and temperature ranges, causing water-absorbing contact of the solution with the gas in said apparatus, removing from the apparatus the resulting emulsion formed by absorption of water from the gas into the solution, passing the said emulsion to a separator and maintaining the said emulsion at a pressure within or close to said pressure range, increasing the temperature of the said emulsion approximately 30° F. while at said pressure to cause the water while in the liquid state to settle out from the emulsion, removing the settled out water from the bottom of said separator and reintroducing the product remaining after said removal of the water into said apparatus to provide at least in part said liquid solution introduced into the apparatus.

3. A method of dehydrating natural gas comprising the steps of flowing the gas through a gas-liquid contact apparatus within a predetermined pressure and temperature range, introducing into the apparatus a water-absorbing solution comprising a hydrocarbon material which is a liquid in said pressure and temperature ranges and a desiccant of the ether structure type dissolved in said hydrocarbon material and balanced to form an emulsion with water which is stable in the apparatus in said pressure and temperature ranges, causing water-absorbing contact of the solution with the gas in said apparatus, removing from the apparatus the resulting emulsion formed by absorption of water from the gas into the solution, passing the said emulsion to a separator and maintaining the said emulsion at a pressure within or close to said pressure range, increasing the temperature of the said emulsion above said temperature range by a moderate amount sufficient to cause agglomeration of the water from said emulsion to thereby effect a rapid and high order separation of water while in the liquid state from said emulsion, removing the thus separated water from the separator and reintroducing the product remaining after said removal of the water into said apparatus to provide at least in part said liquid solution introduced into the apparatus.

References Cited by the Examiner

UNITED STATES PATENTS

| 2,796,145 | 6/1957 | King | 261—92 X |
| 2,981,370 | 4/1961 | Pilo | 55—94 X |
| 3,009,536 | 11/1961 | Glasgow | 55—174 X |

FOREIGN PATENTS

| 65,698 | 1/1943 | Norway. |
| 65,870 | 3/1943 | Norway. |

OTHER REFERENCES

Antara Chemicals Catalogue, AP 35, Mar. 20, 1953, pp. 10 to 12.

A. M. Schwartz, J. W. Perry, J. Berch: Surface Active Agents and Detergents, vol. II, New York, Interscience Publishers, Inc., 1958, pp. 125–134.

REUBEN FRIEDMAN, *Primary Examiner.*

C. N. HART, *Assistant Examiner.*